Jan. 19, 1960   D. S. KUSHNER   2,922,107
TIME-DIRECTION SENSING CIRCUIT
Filed March 30, 1955   2 Sheets-Sheet 1
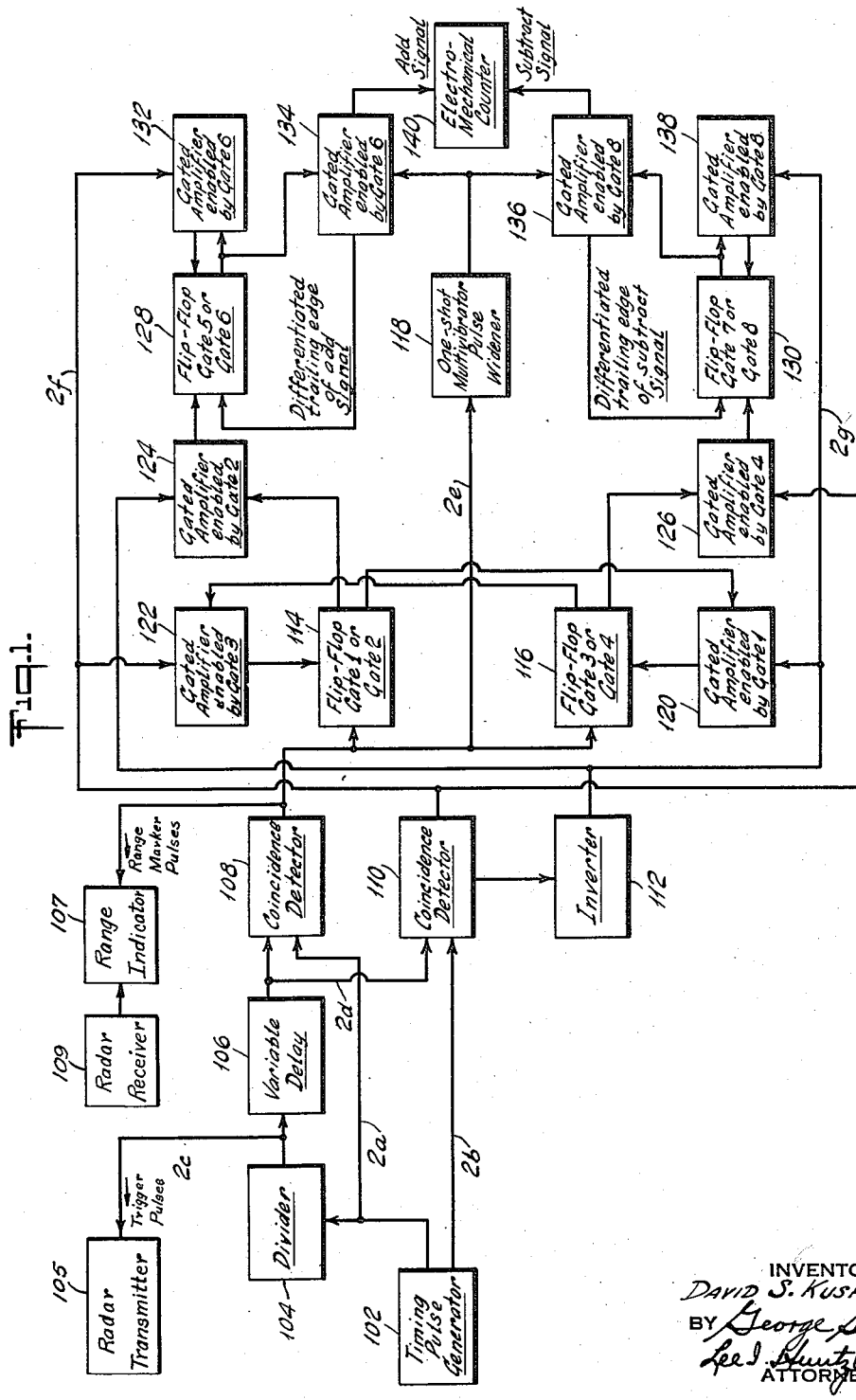
INVENTOR
DAVID S. KUSHNER
BY
ATTORNEY

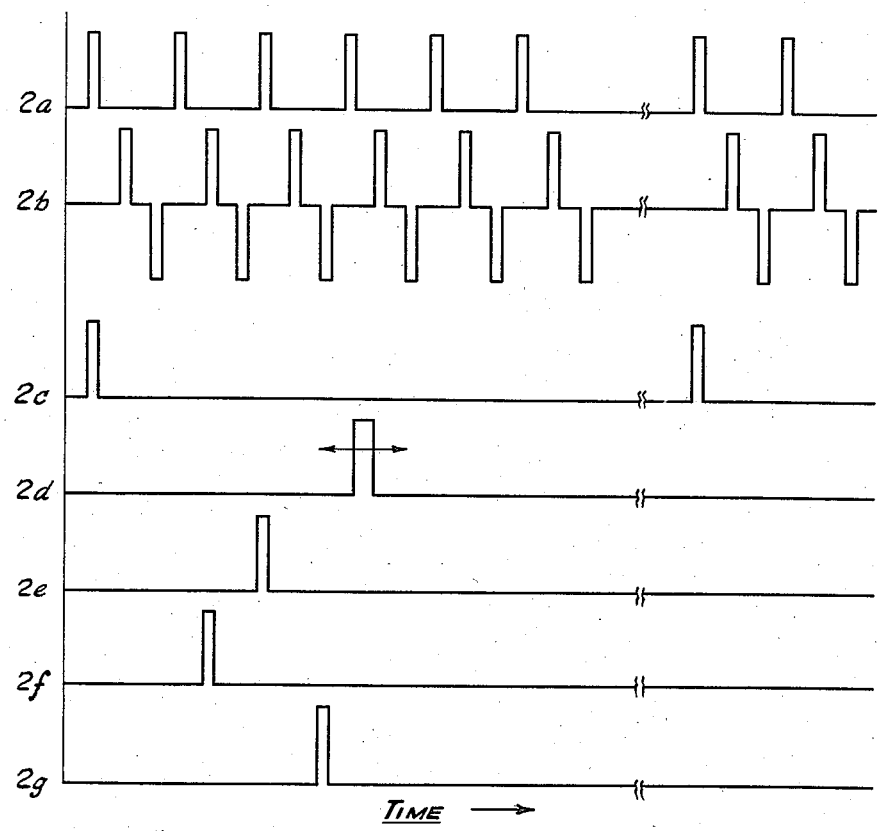

United States Patent Office 2,922,107
Patented Jan. 19, 1960

2,922,107
TIME-DIRECTION SENSING CIRCUIT

David S. Kushner, Brooklyn, N.Y., assignor, by mesne assignments, to the United States of America as represented by the Secretary of the Navy Application March 30, 1955, Serial No. 498,121

6 Claims. (Cl. 324—68)

This invention relates to a time-direction sensing circuit and, more particularly, to a time-direction sensing circuit which senses the order in the time of occurrence of pulses from three separate pulse inputs applied thereto.

The time-direction sensing circuit described herein is particularly suitable for incorporation in a radar system; it employs a chain of accurate timing pulses at a fixed frequency to derive a chain of pulses at a submultiple frequency and of selectively adjustable phase. The adjustable phase pulses are used as range marker pulses to enable accurate determination of the range of a target presented on the range indicator of the radar system. However, this time-direction sensing circuit is useful whenever successive adjustable position pulses may be caused to start at a zero-time periodic reference pulse and be moved out and back along a chain of accurately spaced timing pulses at the discretion of the operator.

A counter, capable of both addition and subtraction, is used to report the progress of the variable position pulse, adding every time a timing pulse is crossed while the variable position pulse is moving away from the reference pulse, and subtracting every time a timing pulse is crossed while the variable position pulse is moving toward the reference pulse. Thus, at any time, the counter will indicate the number of timing pulses between the variable position pulse and the reference pulse.

It is, therefore, an object of this invention to provide a time-direction sensing circuit which provides an output signal only when pulses applied thereto from a plurality of inputs occur in a certain sequential order.

It is a further object of this invention to provide a time-direction sensing circuit which produces a first output signal only when a plurality of inputs applied thereto occur in a first certain order and which produces a second output signal only when the pulses from the plurality of inputs occur in a second certain order.

It is a still further object of this invention to provide a time-direction sensing circuit which can distinguish between the movement of a variable position pulse, relative to a reference pulse, away from and toward the reference pulse.

A further object is to provide a superior range measuring circuit for an echo ranging system.

Other objects and many of the attendant advantages of this invention will be readily appreciated as the same becomes better understood by reference to the following detailed description when considered in connection with the accompanying drawings wherein:

Fig. 1 is a block diagram of a circuit incorporating the principles of this invention; and Fig. 2 is a graph illustrating the relative time of occurrence of pulses appearing at various points in the circuit of Fig. 1.

Referring now to Figs. 1 and 2, timing pulse generator 102 generates a first chain of timing pulses, $2a$ in Fig. 2, which occur at a fixed high frequency, such as 100,000 kilocycles. Also generated by timing pulse generator 102 is a second chain of timing pulses, $2b$ in Fig. 2, which includes alternate positive and negative pulses. The positive and negative $2b$ timing pulses respectively occur at the same fixed frequency as the $2a$ timing pulses. Each positive $2b$ timing pulse is spaced in time relative to the preceding $2a$ timing pulse by a given amount and each negative $2b$ pulse is spaced in time relative to the preceding positive $2b$ timing pulse by the same given amount. Both timing pulses $2a$ and $2b$ are derived from the oscillations of a single precision oscillator incorporated in timing pulse generator 102.

Also incorporated in timing pulse generator 102 are delay means for delaying the positive and negative $2b$ timing pulses.

Timing pulses $2a$ are applied to divider 104 which produces as an output reference pulses, $2c$ in Fig. 2, occurring at a sub-multiple, such as .001, of the fixed frequency of timing pulses $2a$. Each reference pulse $2c$, however, occurs in time coincidence with a timing pulse $2a$. Reference pulses $2c$ trigger the transmitter 105 of a radar system, and are also applied to variable delay 106 to provide as an output variable position pulses, $2d$ in Fig. 2. Each variable position pulse $2d$ follows a reference pulse $2c$ by a time interval which may be varied at will anywhere between zero and a pulse repetition period of reference pulses $2c$ by means included in variable delay 106. Further, variable delay 106 includes means for widening the variable position pulses $2d$, the pulse width of variable position pulses $2d$ being greater than the pulse width of timing pulses $2a$ and $2b$, but less than the time interval between the time of occurrence of a timing pulse $2a$ and the next following positive timing pulse $2b$.

The timing pulses $2a$ and variable position pulses $2d$ are applied as first and second inputs to coincidence detector 108. Coincidence detector 108 provides an output pulse, $2e$ in Fig. 2, in response to coincidence in the time of occurrence of a timing pulse $2a$ and a variable position pulse $2d$. Output pulses $2e$ are employed in the associated radar system as range markers, being applied to range indicator 107. Target echoes received by radar receiver 109 are delivered to the range indicator 107.

Timing pulses $2b$ and variable position pulses $2d$ are applied as first and second inputs to coincidence detector 110. Coincidence detector 110 provides an output pulse, $2f$ in Fig. 2, in response to coincidence in the time of occurrence of a positive timing pulse $2b$ and a variable position pulse $2d$. Coincidence detector 110 also produces a negative output pulse in response to coincidence in the time of occurrence of a negative timing pulse $2b$ and a variable position pulse $2d$. The negative output pulse is inverted by inverter 112 to provide a positive pulse, $2g$ in Fig. 2.

Pulses $2e$ are applied from coincidence detector 108 to flip-flop 114, flip-flop 116 and one-shot multivibrator pulse widener 118. Flip-flop 114 has 2 stable positions designated as gate 1 and gate 2, respectively. Flip-flop 116 has 2 stable positions designate as gate 3 and gate 4, respectively. A pulse $2e$ from coincidence detector 108 is effective in switching flip-flop 114 from its gate 2 to its gate 1 position and in switching flip-flop 116 from its gate 4 to its gate 3 position. One output of flip-flop 114 is applied to gated amplifier 120 and is effective in enabling gated amplifier 120 to conduct when flip-flop 114 is in its gate 1 position. One output of flip-flop 116 is applied to gated amplifier 122 and is effective in enabling gated amplifier 122 to conduct when flip-flop 116 is in its gate 3 position.

Pulse output $2f$ from coincidence detector 110 is applied as an input to gated amplifier 122 and pulse output 2g from inverter 112 is applied as an input to gated amplifier 120. The output of gated amplifier 120 is applied to flip-flop 116 and is effective in switching flip-flop 116 from its gate 3 to its gate 4 position. The output of gated amplifier 122 is applied to flip-flop 114 and is effective in switching flip-flop 114 from its gate 1 to its gate 2 position.

A second output from flip-flop 114 is applied to gated amplifier 124 and is effective in enabling gated amplifier 124 to conduct when flip-flop 114 is in its gate 2 position. A second output from flip-flop 116 is applied to gated amplifier 126 and is effective in enabling gated amplifier 126 to conduct when flip-flop 116 is in its gate 4 position. Pulse 2f from coincidence detector 110 is applied as an input to gated amplifier 126 and pulse 2g from inverter 112 is applied as an input to gated amplifier 124.

Flip-flop 128 has two stable positions designated as gate 5 and gate 6, respectively, and flip-flop 130 has 2 stable positions designated as gate 7 and gate 8, respectively. The output of gated amplifier 124 is applied to flip-flop 128 and is effective in switching flip-flop 128 from its gate 5 to its gate 6 position. The output of gated amplifier 126 is applied to flip-flop 130 and is effective in switching flip-flop 130 from its gate 7 to its gate 8 position.

The output from flip-flop 128 is applied to gated amplifiers 132 and 134 and is effective in enabling gated amplifiers 132 and 134 to conduct when flip-flop 128 is in its gate 6 position. The output of flip-flop 130 is applied to gated amplifiers 136 and 138 and is effective in enabling gated amplifiers 136 and 138 to conduct when flip-flop 130 is in its gate 8 position.

Pulse 2f from coincidence detector 110 is applied as an input to gated amplifier 132 and pulse 2g from inverter 112 is applied as an input to gated amplifier 138. The output of one-shot multivibrator pulse widener 118, which has pulse 2e from coincidence detector 108 applied thereto, is applied as an input to gated amplifiers 134 and 136.

The output of gated amplifier 132 is applied to flip-flop 128 and is effective in switching flip-flop 128 from its gate 6 to its gate 5 position. The output of gated amplifier 138 is applied to flip-flop 130 and is effective in switching flip-flop 130 from its gate 8 position to its gate 7 position.

The output of gated amplifier 134 is applied to the add actuating means of electromechanical counter 140 and the output of gated amplifier 136 is applied to the subtract actuating means of electromechanical counter 140. In addition, the add signal output of gated amplifier 134 is differentiated and applied to flip-flop 128, where the trailing edge thereof is effective in switching flip-flop 128 from its gate 6 to its gate 5 position. Similarly, the subtract signal output of gated amplifier 136 is differentiated and applied to flip-flop 138, where the trailing edge thereof is effective in switching flip-flop 130 from its gate 8 to its gate 7 position.

The operation of the circuit shown in Fig. 1 will now be considered.

Since the range marker is a 2e pulse, obtained at the output of coincidence detector 108, the range marker will only be produced when the time of occurrence of a variable position 2d pulse coincides with the time of occurrence of a 2a timing pulse. To increase the range represented by the range marker, variable delay 106 is adjusted to move variable position pulse 2d further away from reference pulse 2c, so as to provide coincidence of variable position pulse 2d with a later occurring 2a timing pulse. As will be seen from the relative time of occurrences of timing pulses 2a and 2b shown in Fig. 2, a first 2e pulse will be followed in sequential order by a 2f pulse, a 2g pulse, another 2e pulse, etc. when variable position pulse 2d is moved farther away from reference pulse 2c. However, if variable delay 106 is adjusted to move variable position pulse 2d closer to reference pulse 2c, a first 2e pulse will be followed in sequential order by a 2g pulse, a 2f pulse, another 2e pulse, etc. An add signal is produced only in response to 2e pulse being follower by a 2f pulse, a 2g pulse and another 2e pulse, and a subtract signal is produced only in response to a 2e pulse being followed by a 2g pulse, a 2f and another 2e pulse.

To illustrate the functions of the various flip-flops and gated amplifiers in producing the add and subtract signals, a typical sequence of operation will now be discussed. Assume that variable position pulse 2d has just coincided with a 2a timing pulse to produce a 2e pulse, and that this 2e pulse has been registered by electromechanical counter 140, which has been initially set to indicate zero when variable position pulse 2d coincides with reference pulse 2c, that is, when variable delay 106 provides a zero delay. Flip-flop 114 will then be in its gate 1 position, flip-flop 116 will be in its gate 3 position, flip-flop 128 will be in its gate 5 position and flip-flop 130 will be in its gate 7 position. Therefore only gated amplifiers 120 and 122 are enabled while gated amplifiers 124, 126, 132, 134, 136 and 138 are disabled.

As an example consider the variable position pulse 2d is moved farther out relative to reference pulse 2c, up to the next following negative 2b timing pulse, then reversed and moved in towards reference pulse 2c. Then following the original 2e pulse there will occur a 2f pulse, a 2g pulse, a 2f pulse, a 2e pulse, a 2g pulse, a 2f pulse, a 2e pulse, etc.

Since only gated amplifiers 120 and 122 are enabled, the 2f pulse which is first to appear is passed by gated amplifier 122, thereby switching flip-flop 114 from its gate 1 to its gate 2 position. This causes gated amplifier 120 to be disabled and gated amplifier 124 to be enabled. The 2g pulse which appears next is therefore passed only by gated amplifier 124, thereby switching flip-flop 128 from its gate 5 to its gate 6 position. This enables gated amplifiers 132 and 134

Should a 2e pulse next appear it would pass through gated amplifier 134 after having been widened by one-shot multivibrator pulse widener 118 and an add signal would be applied to the add actuating means of electromechanical counter 140. One shot multivibrator pulse widener 118 is employed to ensure that the add signal has enough energy to operate the add actuating means of the electromechanical counter 140.

However, since the direction of the movable pulse is now reversed, a 2f pulse, rather than a 2e pulse, next appears. This 2f pulse passes through gated amplifier 122, but has no effect thereon, since flip-flop 114 is already switched to its gate 2 position. Also, this 2f pulse passes through gated amplifier 132 where it is effective in switching flip-flop 128 back from its gate 6 to its gate 5 position, thereby disabling gated amplifiers 132 and 134.

Next to appear is a 2e pulse which occurs at the same time relative to reference pulse 2c as the original 2e pulse. This 2e pulse is not counted by electromechanical counter 140, since gated amplifier 134 is now disabled. However, it is effective in switching flip-flop 114 back from its gate 2 to its gate 1 position.

Conditions now are exactly the same as at the start of operations, i.e. flip-flop 114 is in its gate 1 position, flip-flop 116 is in its gate 3 position, flip-flop 128 is in its gate 5 position, flip-flop 130 is in its gate 7 position, gated amplifiers 120 and 122 are enabled and gated amplifiers 124, 126, 132, 134, 136 and 138 are disabled.

As variable position pulse 2d continues to move toward reference pulse 2c, a 2g pulse is the next to appear. This 2g pulse passes through gated amplifier 120 and switches flip-flop 116 from its gate 3 to its gate 4 position, thus enabling gated amplifier 126 and disabling gated amplifier 122. The 2f pulse which next occurs passes through gated amplifier 126 and switches flip-flop 130 from its gate 7 to its gate 8 position. This enables gated amplifiers 136 and 138. A 2e pulse, which is next to appear, is applied to flip-flop 116 where it switches flip-flop 116 back from its gate 4 position to its gate 3 position. Also this 2e pulse is applied to still enabled gated amplifier 136 through one shot multivibrator pulse widener 118 to provide a subtract signal which is applied to the subtract actuating means of electromechanical counter 140. The trailing edge of the subtract signal is differentiated and applied to flip-flop 130 to switch it back from its gate 8 to its gate 7 position. The entire circuit is now again in the same condition as before the start of the operation.

Obviously many modifications and variations of the present invention are possible in the light of the above teachings. It is therefore to be understood that within the scope of the appended claims the invention may be practiced otherwise than as specifically described.

I claim:

1. In combination, a source of pulses producing first, second and third separate pulse outputs, and time-direction sensing means coupled to said source and responsive to said first, second and third pulse outputs for producing a first signal only in response to the occurrence of a first pulse output being followed directly in sequential order by the occurrence of a second pulse output, a third pulse output and another first pulse output, said time-direction sensing means producing a second signal only in response to the occurrence of a first pulse output being followed in sequential order by the occurrence of a third pulse output, a second pulse output and another first pulse output, said time-direction sensing means comprises four flip-flop circuits each having first and second stable positions and eight gated amplifiers, means for applying said second pulse output as an input to a first, second and third of said amplifiers, means for applying said third pulse output as an input to a fourth, fifth, and sixth of said amplifiers, means coupling a first of said flip-flop circuits to said first and second amplifiers for enabling said first amplifier to conduct only when said first flip-flop circuit is in its first position and enabling said second amplifier to conduct only when said first flip-flop circuit is in its second position, means coupling a second of said flip-flop circuits to said fourth and fifth amplifiers for enabling said fourth amplifier to conduct only when said second flip-flop circuit is in its first position and enabling said fifth amplifier to conduct only when said second flip-flop circuit is in its second position, means for applying the output of said first amplifier as an input to said second flip-flop circuit to flip said second flip-flop circuit from its first position to its second position, means for applying the output of said fourth amplifier as an input to said first flip-flop circuit to flip said first flip-flop circuit from its first position to its second position, means for applying said first pulse output to said first and second flip-flop circuits to flop said first and second flip-flop circuits from their second position to their first position, means for applying said first pulse output as an input to the seventh and eighth of said amplifiers, means coupling a third of said flip-flop circuits to said third and seventh amplifiers to enable said third and seventh amplifiers to conduct only when said third flip-flop circuit is in its second position, means coupling the fourth of said flip-flop circuits to said sixth and eighth amplifiers to enable said sixth and eighth amplifiers to conduct only when said fourth flip-flop circuit is in its second position, means for applying the output of said fifth amplifier to said third flip-flop circuit to flip said third flip-flop circuit from its first position to its second position, means for applying the output of said second amplifier to said fourth flip-flop circuit to flip said fourth flip-flop circuit from its first position to its second position, means for applying respectively the output of said third amplifier and the trailing edge of the output of said seventh amplifier to said third flip-flop circuit to flop said third flip-flop circuit from its second position to its first position, and means for applying respectively, the output of said sixth amplifier and the trailing edge of the output of said eighth amplifier to said fourth flip-flop circuit to flop said fourth flip-flop circuit from its second position to its first position, the output of said seventh amplifier being said first signal and the output of said eighth amplifier being said second signal.

2. The combination in accordance with claim 1, wherein said means for applying said first pulse output as an input to the seventh and eighth of said amplifiers includes means for increasing the width of each pulse of said first pulse output applied to said seventh and eighth amplifiers.

3. The combination in accordance with claim 2, further including an electromechanical counter having add actuating means and subtract actuating means, means applying said first signal to said counter for operating said add actuating means and means applying said second signal to said counter for operating said subtract actuating means.

4. The combination in accordance with claim 3, wherein said source of pulses comprises pulse generating means for generating first, second and third chains of timing pulses at a given fixed frequency and a fourth chain of pulses at a repetition rate equal to a given sub-multiple of said given fixed frequency, each pulse of said second chain of pulses occurring between successive pulses of said first chain and each pulse of said third chain occurring between a pulse of said second chain and the next following pulse of said first chain, said pulse generating means including adjusting means for variably positioning the time of occurrence of pulses of said fourth chain relative to the time of occurrence of pulses of said first, second and third chains, and coincidence means coupled to said pulse generating means and responsive to said first, second, third and fourth chains of pulses for producing respectively said first, second and third pulse outputs in response to coincidence in the time of occurrence of a pulse from said fourth chain with a pulse from said first, second and third chains respectively.

5. Apparatus for use in an echo ranging equipment having a transmitter, a receiver, and a range indicator for indicating target echoes received by said receiver for enabling accurate determination of the range of a target from which echoes are returned, comprising: a timing pulse generator continuously providing timing pulses with a constant period and of pulse width that is small compared to pulse period; a divider coupled to said timing pulse generator and receiving timing pulse energy therefrom and in turn providing pulses that are of substantially the same width as the timing pulses and that are locked relative to the timing pulses and whose period is a constant and large multiple of the timing pulse period, for use in triggering said transmitter; selectively adjustable pulse delay means coupled to said divider and receiving some of the trigger pulse energy provided thereby and in turn providing corresponding pulses of pulse width that is on the order of the timing pulse width and that are delayed relative to the corresponding pulses from said divider for a time interval anywhere between zero and the period of one pulse from said divider according to the selected adjustment of said divider, means for delivering pulse energy to said range indicator in time coincidence with pulse energy from said adjustable pulse delay means, whereby when said adjustable pulse delay means is adjusted so that the range indicator indicates that pulses from said pulse delay means coincide with pulse echoes from a target, the range of the target is directly proportional to the time displacement between the pulses from said divider and the corresponding pulses from said adjustable pulse delay means; and counting and indicating means coupled to said timing pulse generator, to said adjustable pulse delay means and to said means for delivering pulse energy to said range indicator for providing a count of the number of timing pulse periods between the pulses from said divider and the corresponding pulses from said adjustable delay means, 6. Apparatus for use in echo ranging equipment as defined in claim 5, wherein said counting and indicating means includes three pulse-providing devices coupled to said adjustable delay means and said timing pulse generator, one of which devices is said means for delivering pulse energy to said range indicator, which devices are each pulsed once in a predetermined spaced sequence during each pulse period of said timing pulse generator, the spacings in the pulsing sequences being greater than the width of pulses from said adjustable delay means, each of said devices producing an output coincident with the aforementioned pulsing thereof only when a pulse from said adjustable delay means arrives thereat at the same instant, whereby as said adjustable pulse delay means is adjusted the pulses therefrom cause said three devices to produce outputs in a sequence that either is the same or the reverse of the sequence in which said devices are pulsed, the sequence of the outputs from said three devices depending upon whether the time displacement between corresponding pulses of said divider and adjustable pulse delay means is increased or decreased by said adjustable pulse delay means, said counting and indicating means further including means coupled to said three devices and responsive to outputs therefrom to increase or decrease the count of timing pulse periods in accordance with the number of and the order of pulse sequences from said three devices.

References Cited in the file of this patent
UNITED STATES PATENTS

| | | |
|---|---|---|
| 2,119,064 | Watanabe | May 31, 1938 |
| 2,601,393 | Hammond | June 24, 1952 |
| 2,626,981 | Shiepe | Jan. 27, 1953 |